United States Patent
Toda et al.

(10) Patent No.: US 12,323,259 B2
(45) Date of Patent: Jun. 3, 2025

(54) CONTROL DEVICE, CONTROL METHOD THEREOF, AND CONTROL PROGRAM

(71) Applicant: MITSUBISHI HEAVY INDUSTRIES, LTD., Tokyo (JP)

(72) Inventors: Shinichi Toda, Kanagawa (JP); Minoru Nakaide, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/284,695

(22) PCT Filed: Feb. 9, 2022

(86) PCT No.: PCT/JP2022/005157
§ 371 (c)(1),
(2) Date: Sep. 28, 2023

(87) PCT Pub. No.: WO2022/209334
PCT Pub. Date: Oct. 6, 2022

(65) Prior Publication Data
US 2024/0171417 A1   May 23, 2024

(30) Foreign Application Priority Data
Mar. 31, 2021 (JP) ................. 2021-060071

(51) Int. Cl.
  G06F 15/173  (2006.01)
  G05B 19/042  (2006.01)
  H04L 12/12  (2006.01)
(52) U.S. Cl.
  CPC .......... H04L 12/12 (2013.01); G05B 19/0421 (2013.01)
(58) Field of Classification Search
  CPC ................................... G05B 19/0421
  See application file for complete search history.

(56) References Cited

U.S. PATENT DOCUMENTS

| 2007/0156253 A1* | 7/2007 | De Silvio | G05B 19/056 700/6 |
| 2011/0116443 A1* | 5/2011 | Yu | H04L 47/34 370/328 |
| 2020/0192319 A1* | 6/2020 | Ong | G10L 17/22 |

FOREIGN PATENT DOCUMENTS

| JP | S58-018740 A | 2/1983 |
| JP | 2009-278328 A | 11/2009 |

OTHER PUBLICATIONS

International Search Report dated Apr. 5, 2022, issued in counterpart International application No. PCT/JP2022/005157, with English translation. (5 pages).

(Continued)

*Primary Examiner* — Joseph R Maniwang
(74) *Attorney, Agent, or Firm* — WHDA, LLP (57) ABSTRACT

An object is to provide a control device, a control method thereof, and a control program that can simplify the configuration. The control device (C1) configured to control a control target instrument includes: an input unit (IN1) configured to accept input of an input signal including input information and transmit the input information to a communication network (NW); and a CPU_1 configured to receive the input information from the input unit (IN1) via the communication network (NW) and perform control based on the input information, and the CPU_1 transmits the received input information via the communication network (NW) to a CPU_2 configured to control a control target instrument in another device (C2) provided independently of the control device (C1).

10 Claims, 9 Drawing Sheets

(56) References Cited

OTHER PUBLICATIONS

Written Opinion dated Apr. 5, 2022, issued in counterpart International application No. PCT/JP2022/005157, with English translation. (8 pages).

* cited by examiner

CONTROL DEVICE, CONTROL METHOD THEREOF, AND CONTROL PROGRAM

TECHNICAL FIELD

The present disclosure relates to a control device, a control method thereof, and a control program.

BACKGROUND ART

In control devices, input signals input from sensors or the like are transferred from an input module to a CPU or the like, and control is performed.

Patent Literature 1 discloses performing information transmission by using a broadcast communication system in which a station to receive data transmitted from a base station is not specified and all other stations receive the data at the same time, as an example of information transfer.

CITATION LIST

Patent Literature

[PTL 1]
Patent Application Laid-Open No. S58-18740

SUMMARY OF INVENTION

Technical Problem

In information transmission, a system to perform information transmission from a single input module to a single CPU, instead of the broadcast communication system, may be employed to improve reliability of transmission. In such a scheme, however, when an input signal is used by a plurality of control devices, it is required to branch the input signal and input the branched input signals to multiple input modules of respective control devices. In such a case, since it is required to provide the input modules and interface cabinets storing the input modules for the number of control devices and also install wiring cables, this requires costs therefor.

The present disclosure has been made in view of such circumstances and intends to provide a control device whose configuration can be simplified, a control method of the control device, and a control program.

Solution to Problem

The first aspect of the present disclosure is a control device configured to control a control target instrument, the control device includes: an input unit configured to accept input of an input signal including input information and transmit the input information to a digital communication network; and a control unit configured to receive the input information from the input unit via the digital communication network and perform control based on the input information, and the control unit transmits the received input information via the digital communication network to a further control unit configured to control a control target instrument in another device provided independently of the control device.

The second aspect of the present disclosure is a control method of a control device configured to control a control target instrument, and the control method includes: at an input unit, accepting input of an input signal including input information and transmitting the input information to a digital communication network; at a control unit, receiving the input information from the input unit via the digital communication network and performing control based on the input information; and transmitting the received input information via the digital communication network to a further control unit configured to control a control target instrument in another device provided independently of the control device.

The third aspect of the present disclosure is a control program for a control device configured to control a control target instrument, and the control program is for a computer to cause the control device to perform processes of: at an input unit, accepting input of an input signal including input information and transmitting the input information to a digital communication network; at a control unit, receiving the input information from the input unit via the digital communication network and performing control based on the input information; and transmitting the received input information via the digital communication network to a further control unit configured to control a control target instrument in another device provided independently of the control device.

Advantageous Effects of Invention

The present disclosure achieves an advantageous effect that the configuration can be simplified.

DESCRIPTION OF EMBODIMENTS

One embodiment of a control device, a control method thereof, and a control program according to the present disclosure will be described below with reference to the drawings.

Figure 1:
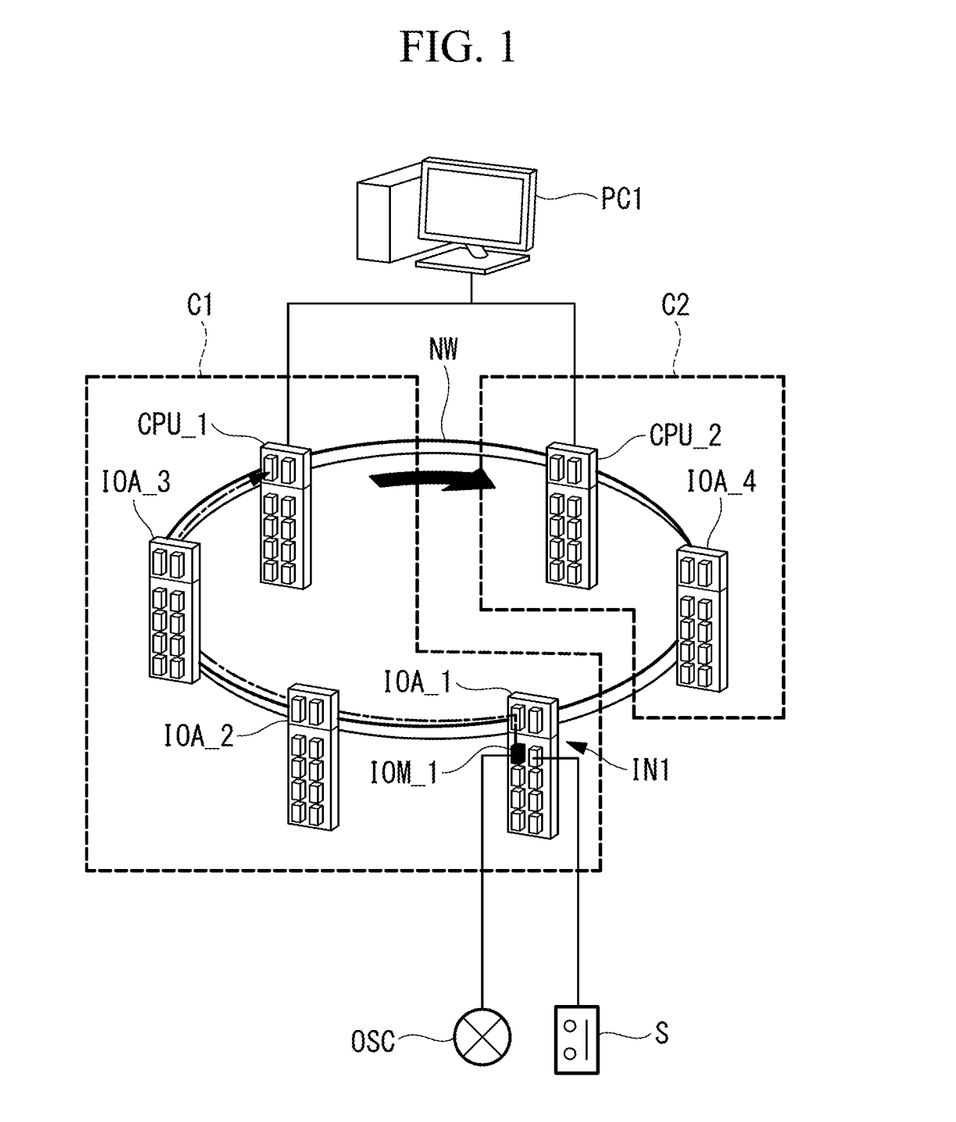
FIG. 1 is a diagram illustrating a general configuration of a control system according to one embodiment of the present disclosure.

FIG. 1 is a diagram illustrating a general configuration of a control system according to one embodiment of the present disclosure. As illustrated in FIG. 1, in the present embodiment, a control device C1 and a control device C2 are connected to each other via a digital communication network (hereafter, referred to as "communication network") NW.

The control device C1 is a control device for controlling (controlling or measuring) a control target instrument. The control device C2 is a device provided independently of the control device C1 and controls (controls or measures) a control target instrument. The control device C1 and the control device C2 perform the control targeted to different control target instruments.

The control device C1 is provided with IOAs (I/O adaptor), IOMs (I//O module), and a CPU (control unit). In the present embodiment, the control device C1 is provided with IOA_1, IOA_2, and IOA_3 as the IOAs and a CPU_1 as the CPU. The control device C2 is also provided with an IOA and a CPU in the same manner. That is, the control device C2 is provided with an IOA_4 as the IOA and a CPU_2 as the CPU. Further, within each control device, respective instruments are connected to each other via the communication network NW and can transmit and receive information. The transfer direction of information is not limited. The communication network NW is an I/O communication network, and high-speed communication is performed in a digital domain. For example, the communication network NW is the Ethernet. Although packet communication is performed in the communication network NW in the present embodiment, other communication systems may be applied. In the following description, when an IOA is individually distinguished from another for description, such an IOA will be denoted as "IOA_1" or the like individually, and when an IOA is not distinguished from another (when described as an I/O adaptor), such an IOA will be denoted as "IOA" for description. The CPU and the IOM will be described in the same manner.

The IOA is arranged for the control device C1 or the control device C2 and is a device for inputting information from outside of the device to inside of the device. For example, the IOA packetizes input information and transmits the information to the communication network NW. The IOA may have a function of information output.

For example, as illustrated in FIG. 1, the IOA_1 (IOM_1) is connected to an instrument (measuring instrument PT) such as an oscillator OSC or a switch (S/W) S, and various input signals are input thereto. For example, a signal from the oscillator OSC is an analog signal, and a signal from the switch S is a digital signal. An analog signal is digitally converted in to a digital signal by the IOM (which is an I/O module, namely, the IOM_1 of FIG. 1) mounted under the IOA_1, and the digital signal is input to the IOA_1. Although the input signal is an input signal from a measuring instrument, a sensor, or the like, for example, the input signal is not limited to the above as long as it is used for control.

That is, an input unit of a control device is formed of one or more IOAs and one or more IOMs (which can be omitted). In FIG. 1, in the control device C1, the IOA_1 and the IOM_1 are indicated as an input unit IN1. In other words, the input unit IN1 serves as a unit configured to accept input of an input signal including input information and transmit the input information to the communication network NW.

The CPU performs control of a control target instrument based on input information transmitted from the IOA. A control rule is set in advance in accordance with an instrument to be controlled.

Furthermore, the CPU transfers input information to a different control device. That is, an input signal from the oscillator OSC or the like is input to the IOA_1 of the control device C1 and then transmitted to the CPU_1 within the control device C1. The CPU_1 receives the input information from the input unit IN1 via the communication network NW. Then, the CPU_1 of the control device C1 controls a control target instrument and also transmits the input information to the CPU_2 of the control device C2 via the communication network NW. That is, the CPU_1 transmits the received input information to the CPU_2 of the control device C2, which is another device provided independently of the control device C1, via the communication network NW. This eliminates the need for the control device C2 to input the signal from the oscillator OSC or the like and thus eliminates the need for an instrument such as a control board (interface cabinet) used therefor. The details of a specific method of information transmission will be described later.

As discussed above, even when control is required to be performed by the control device C1 and the control device C2, respectively, input from the oscillator OSC or the like can be collected into one, and the input unit IN1 (the IOA_1 of the control device C1 in FIG. 1) can be shared.

The CPU_1 of the control device C1 and the CPU_2 of the control device C2 can be configured for various settings via a computer PC1. Specifically, an engineering tool to configure a control system is provided to the computer PC1, and settings for the control device C1 and the control device C2 can be configured via this engineering tool. The CPU_1 of the control device C1 and the CPU_2 of the control device C2 may be able to be operated or monitored via the computer PC1. Specifically, an operator station (operation tool) is provided to the computer PC1, and the control device C1 and the control device C2 can be operated or monitored via this tool.

Figure 2:
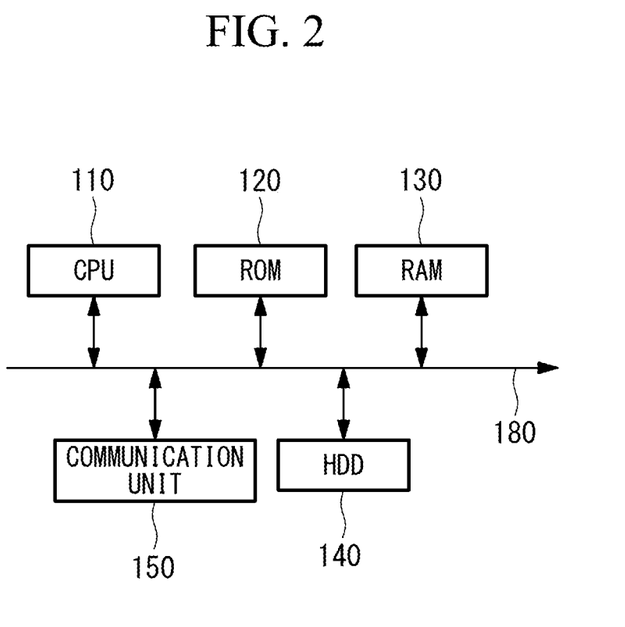
FIG. 2 is a diagram illustrating an example of a hardware configuration of a control device according to one embodiment of the present disclosure.

FIG. 2 is a diagram illustrating an example of a hardware configuration of the control device C1 according to the present embodiment.

As illustrated in FIG. 2, the control device is a computer system (computing system) and includes, for example, a CPU 110, a read only memory (ROM) 120 for storing a program or the like executed by the CPU 110, a random access memory (RAM) 130 that functions as a work area during execution of each program, a hard disk drive (HDD) 140 as a mass storage device, and a communication unit 150 for connection to a network or the like. As the mass storage device, a solid state drive (SSD) may be used. The program or the like executed by the CPU 110 may be stored in the mass storage device and executed while being loaded onto the RAM. These units are connected to each other via a bus 180.

The control device may have an input unit formed of a keyboard, a mouse, or the like, a display unit formed of a liquid crystal display device or the like that displays data, or the like.

A storage medium for storing a program or the like executed by the CPU 110 is not limited to the ROM 120. The storage medium may be other auxiliary storage devices such as a magnetic disk, an optical magnetic disk, a semiconductor memory, or the like, for example.

The process of a series of processing for implementing various functions described later is stored in the hard disk drive 140 or the like in a form of a program, and the CPU 110 loads this program into the RAM 130 or the like to perform modification or calculation processing on information, and thereby respective functions described later are implemented. For a program, a form in which the program is installed in advance in the ROM 120 or other storage media, a form in which the program is provided in a state of being stored in a computer readable storage medium, a form in which the program is delivered via a wired or wireless communication connection, or the like may be applied. The computer readable storage medium may be a magnetic disk, an optical magnetic disk, a CD-ROM, a DVD-ROM, a semiconductor memory, or the like.

The control device C2 also has the same hardware configuration as that of the control device C1.

Figure 3:
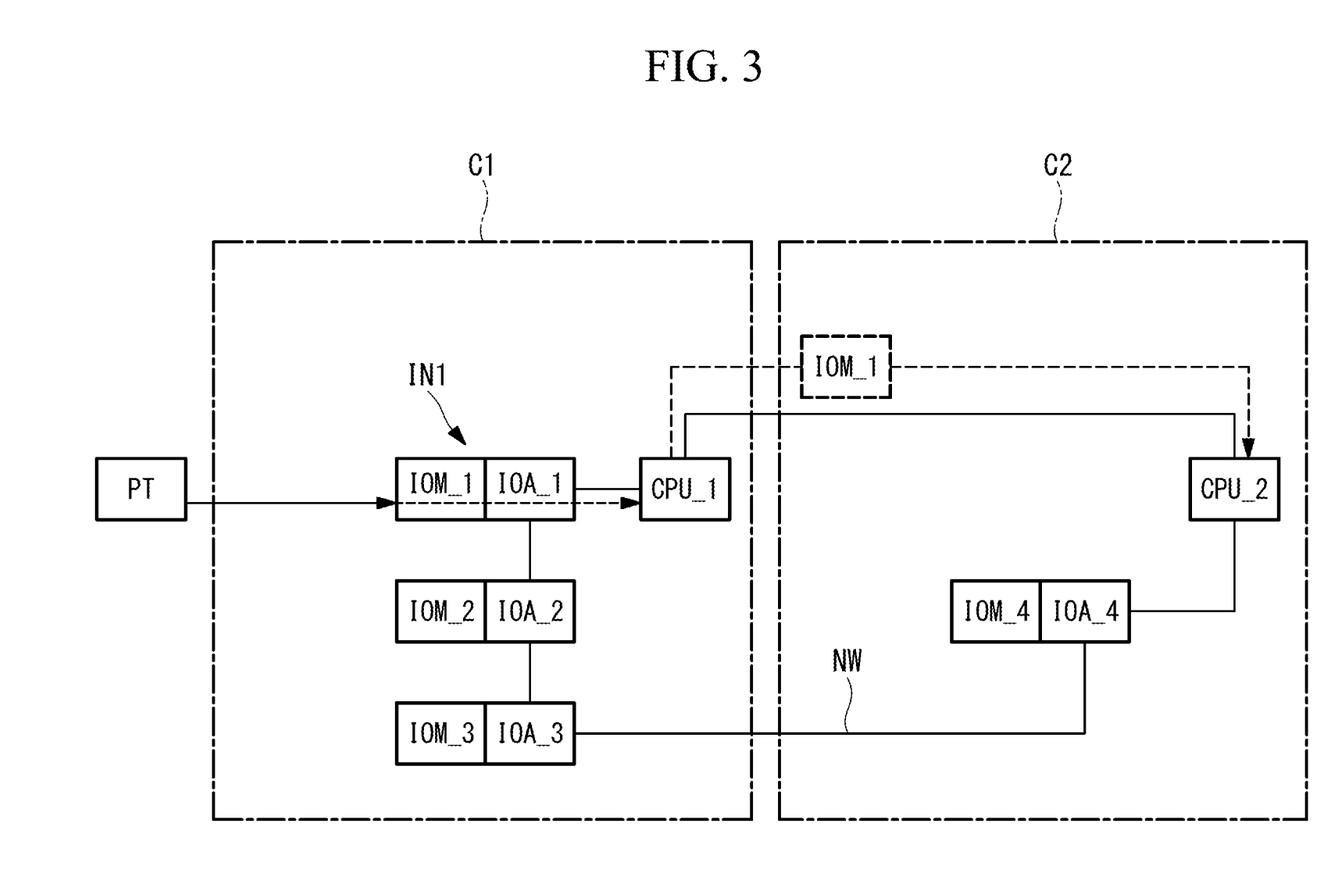
FIG. 3 is a function block diagram illustrating functions of control devices according to one embodiment of the present disclosure.

FIG. 3 is a function block diagram illustrating functions of the control device C1. In FIG. 3, the oscillator OSC is illustrated as the measuring instrument PT. In the control device C1, the IOM_1 and IOA_1, the IOM_2 and IOA_2, the IOM_3 and IOA_3, and the CPU_1 are provided and connected to each other via the communication network NW. In the control device C2, the IOM_4 and IOA_4 and the CPU_2 are provided and connected to each other via the communication network NW. Furthermore, each unit of the control device C1 and each unit of the control device C2 are connected to each other via the communication network NW.

A signal from the measuring instrument PT enters the IOM_1 of the control device C1, and input information is transmitted to the CPU_1 via the IOA_1. That is, the input unit IN1 performs one-to-one communication with the CPU_1. In other words, the input unit IN1 is an input unit dedicated to the CPU_1. This enables reliable information transmission from the input unit IN1 to the CPU_1. On the other hand, the input unit IN1 is unable to transmit information to another CPU_2 when transmitting information to the CPU_1.

Thus, the CPU_1 modifies a packet received from the input unit IN1 and transfers information to the CPU_2 of the control device C2. For example, the CPU_1 performs processing such as modifying destination information in a received packet and transfers a packet including input information from the measuring instrument PT to the CPU_2 via the communication network NW.

Herein, the CPU_1 transfers data in a data format provided from the input unit IN1. That is, the CPU_1 transfers data while maintaining the data being information from the input unit IN1, and the CPU_2 determines that the information transmission has been performed directly from the input unit IN1 and performs processing. Thus, as illustrated in FIG. 3, when viewed from the CPU_2, it appears as if the data is transmitted from a virtual input unit IN1 (the IOM_1 surrounded by the dotted line of FIG. 3). That is, the input unit IN1 is shared by the CPU_1 and the CPU_2, and the input unit IN1 is virtualized when viewed from the CPU_2. The details of a packet conversion method will be described later.

Accordingly, it is possible to share an input unit while performing reliable information transmission.

Figure 4:
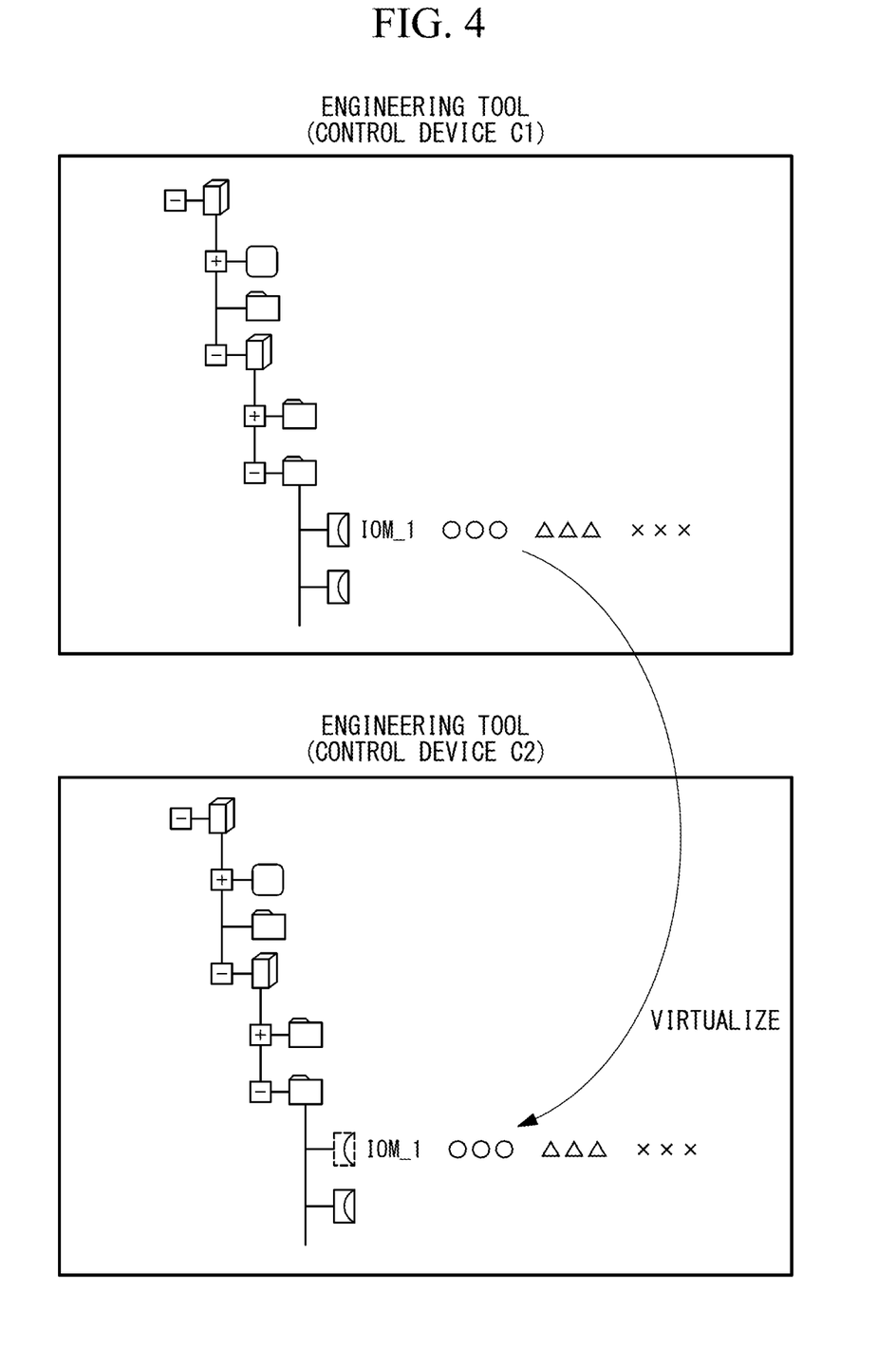
FIG. 4 is a diagram illustrating display examples of an engineering tool according to one embodiment of the present disclosure.
Figure 5:
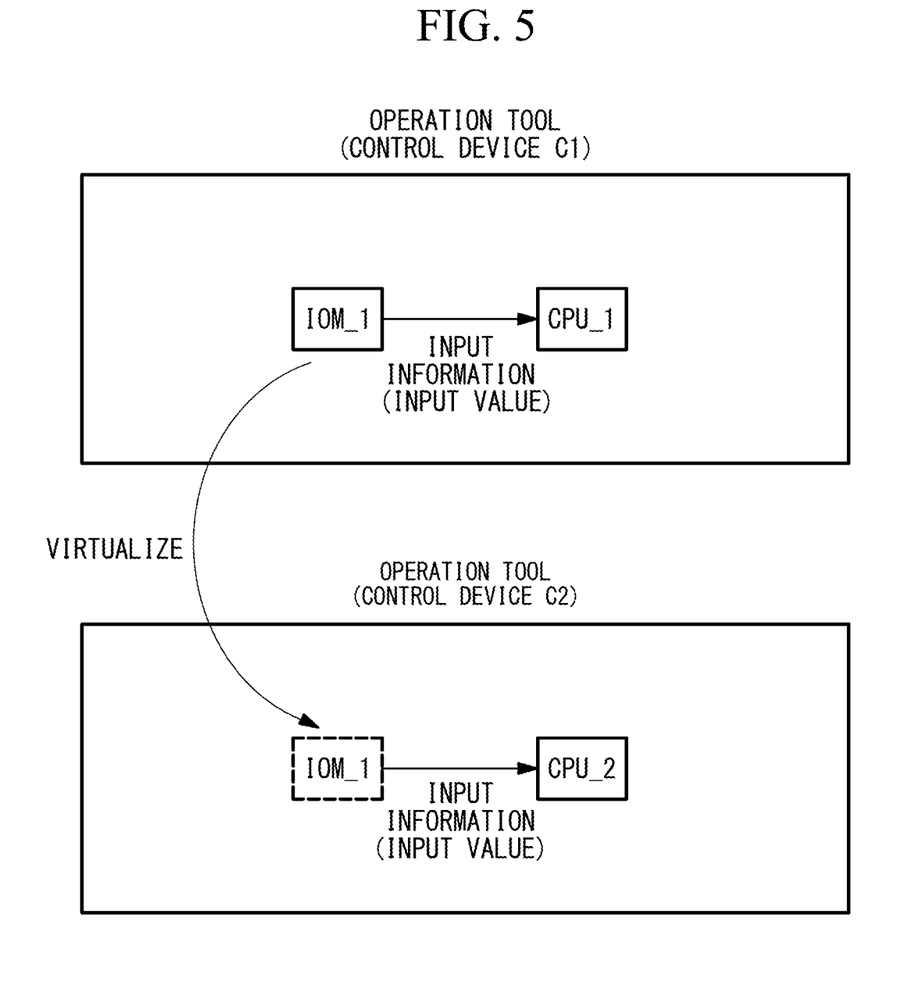
FIG. 5 is a diagram illustrating display examples of an operation tool according to one embodiment of the present disclosure.

FIG. 4 illustrates display examples of an engineering tool of the computer PC1. FIG. 4 illustrates a display example for the control device C1 and a display example for the control device C2, respectively. In the engineering tool, configuration of an input unit is possible. Since the control device C1 transmits information to the CPU_1 through the input unit IN1, the name of the input unit IN1 (for example, IOM_1) is displayed. In the engineering tool, properties are also displayed in addition to the name of the input unit. The properties may be, for example, specification information on an input unit (for example, range information on input current or the like). In FIG. 4, the properties of a module and signals assigned under the module are displayed as "OOO ΔΔΔ xxx". The objects of the input unit IN1 are displayed also for the control device C2 in the same manner as for the control device C1. The object may be displayed as an object representing the input unit IN1 itself or may be displayed as a virtualized input unit. In such a way, in the engineering tool, the object of the input unit IN1 is displayed for both the control device C1 and the control device C2. FIG. 5 illustrates display examples of an operation tool of a computer. FIG. 5 illustrates a display example for the control device C1 and a display example for the control device C2, respectively. Both the display examples display that the input is provided from the input unit IN1. In the input information (input value) in FIG. 5, a numerical value that is specific data measured by the measuring instrument PT is displayed, for example.

Next, an example of packet conversion in information transmission will be described.

Figure 6:
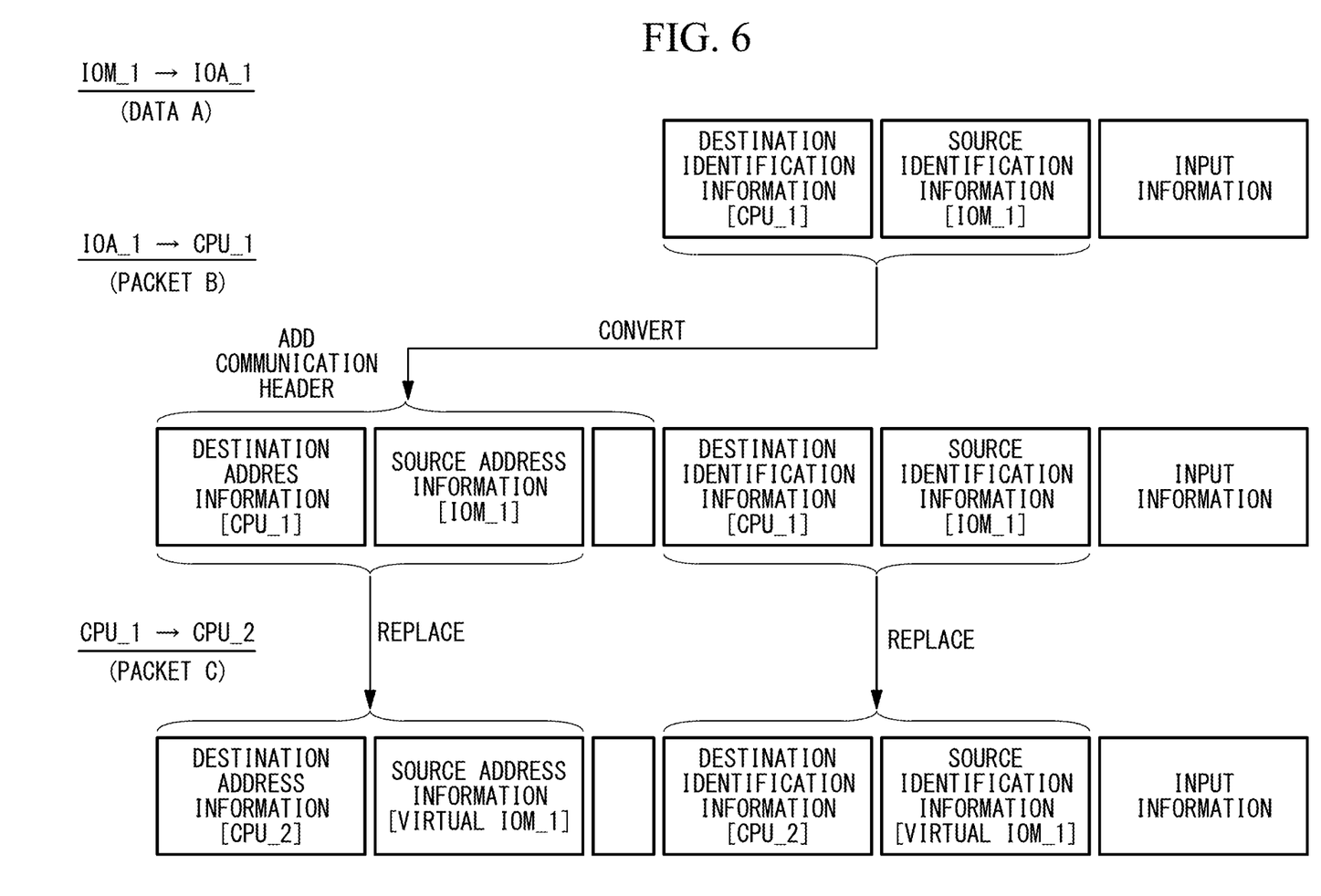
FIG. 6 is a diagram illustrating an example of packet conversion according to one embodiment of the present disclosure.

FIG. 6 is a diagram illustrating an example of packet conversion according to the present embodiment. FIG. 6 illustrates data A delivered from the IOM_1 to the IOA_1, a packet B delivered from the IOA_1 to the CPU_1, and a packet C delivered from the CPU_1 to the CPU_2, respectively. In summary, the input unit IN1 forms a packet including destination information destined to the CPU_1 (destination identification information), a source information originated from the input unit (source identification information), and input information and transmits the packet to the communication network NW. The CPU_1 then receives the packet, converts the destination information into information destined to another control unit (CPU_2), and transmits the converted information to another control unit (CPU_2).

First, the data A is formed by the IOM_1 and delivered to the IOA. Specifically, the data A includes destination identification information, source identification information, and input information. The destination identification information is unique information indicating an instrument to which the data A is to be delivered. Since the IOA_1 performs delivery to the CPU_1, the destination identification information is set in association with the CPU_1. The source identification information is unique information indicating an instrument that is the source of the data A. That is, the source identification information is information representing that the input is input from the input unit. Since the data A is transmitted from the IOM_1, the source identification information is set in association with the IOM_1. The source identification information may be any information that can identify an input unit. The input information is input data. That is, the input information is information input from a sensor such as the oscillator OSC or the switch S.

In the present embodiment, since a single input unit transmits information to a single CPU, the number of pieces of destination identification information and the number of pieces of source identification information each are one.

The IOA_1 then converts the data A into data having the structure of the packet B. Specifically, destination address information is set based on destination identification information, and source address information is set based on source identification information. The destination address information and the source address information form a communication header. In the IOA_1, destination address information corresponding to destination identification information and source address information corresponding to source identification information are set in advance, respectively. The communication header may include other information. For example, the communication header may include type information or the like in a case of Ethernet communication.

Because the communication header having the destination address information and the source address information is added as discussed above, input information is delivered to the CPU_1 over the communication network NW.

The CPU_1 then receives the packet B and controls a control target instrument based on the input information. Specifically, the input information is loaded onto a memory of the CPU_1, and control calculation is performed.

In addition to the above, the CPU_1 converts the packet B into the structure of the packet C. Specifically, the destination identification information is set (replaced) in association with the CPU_2. The source identification information is set in association with the virtual IOM_1. The virtual IOM_1 is a virtual IO module corresponding to the IOM_1. Since there is no direct delivery from the IOM_1 to the CPU_2 in the actual operation, the virtual IOM_1 is set as the source identification information as a virtually provided IOM_1. Because an IOM is set as the virtual IOM_1, the CPU_2 can recognize that the IOM is the virtual module of the IOM_1. In the conversion into the packet C, however, the source identification information corresponding to the IOM_1 may be maintained without modification of the source identification information.

The CPU_1 then sets destination address information in association with the replaced destination identification information and sets source address information in association with the replaced source identification information. The destination address information and the source address information form a communication header. In such a way, the CPU_1 sets the CPU_2, which is another device, as the destination.

Because the communication header having the destination address information and the source address information is added as discussed above, the input information is delivered from the CPU_1 to the CPU_2 over the communication network NW.

Since the CPU_1 converts and transfers destination address information to the CPU_2, the input information input to the input unit corresponding to the CPU_1 can also be received at the CPU_2 at the same sampling cycle. Since it appears from the CPU_2 that the input information is received from the virtual IOM_1, this means that the IOM is virtualized. The CPU_2 then controls a control target instrument based on the received input information.

FIG. 6 is a mere example of the packet structure, and the packet structure is not limited thereto. When the communication network NW is formed of Ethernet, the communication header may include a protocol header such as a type code or an IP layer. The destination identification information or the source identification information may be converted or deleted as long as input information is correctly transmitted from the input unit to the CPU_1 and then the CPU_1 to the CPU_2.

Figure 7:
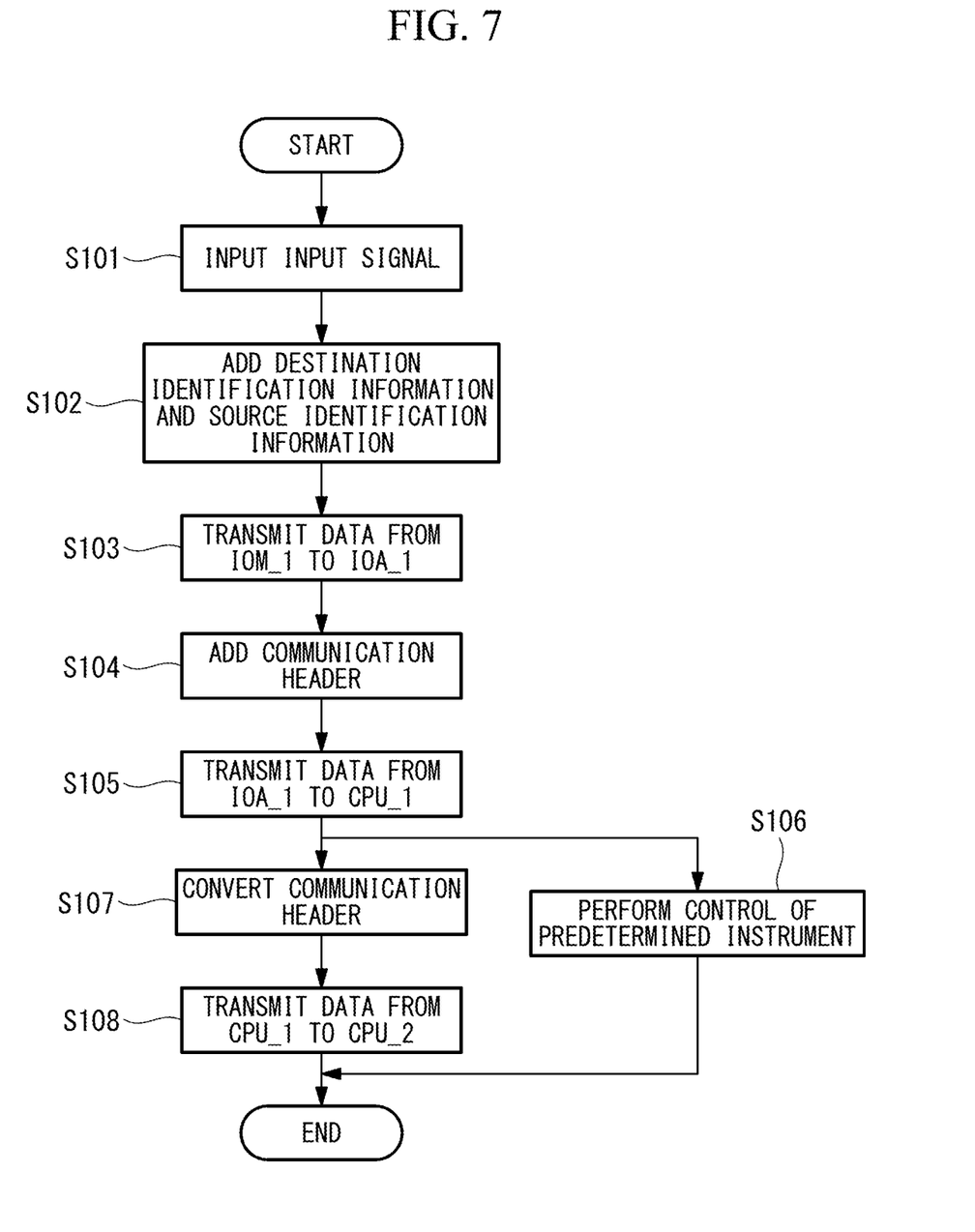
FIG. 7 is a flowchart illustrating an example of a procedure of processing performed by the control device according to one embodiment of the present disclosure.

Next, an example of the processing performed by the control device described above will be described with reference to FIG. 7. FIG. 7 is a flowchart illustrating an example of a procedure of the processing performed by the control device C1 according to the present embodiment. The flow illustrated in FIG. 7 is performed repeatedly at a predetermined control cycle when the control device C1 is in operation, for example.

First, an input signal is input to the input unit IN1 (S101). That is, input information is input to the IOM_1 as the input signal.

Next, in the IOM_1, destination identification information and source identification information are added to the input information (S102).

Next, data is transmitted from the IOM_1 to the IOA_1 (S103).

Next, in the IOA_1, a communication header (the destination address information and the source address information) is added (S104).

Next, data is transmitted from the IOA_1 to the CPU_1 (S105).

The CPU_1 then performs control of a control target instrument based on the transmitted data (in particular, the input information) (S106).

The CPU_1 performs conversion on the transmitted data in order to transmit the communication header (the destination address information and the source address information) to the CPU_2 (S107).

The data is then transmitted from the CPU_1 to the CPU_2 (S108). Although the case where the process of S106 and the process of S107 and S108 are performed in parallel has been described in the present embodiment, the order to perform both the processes is not limited to such parallel processing. For example, the process of S101 to S103 is performed at the IOM_1, the process of S103 to S105 is performed at the IOA_1, the process of S105 to S108 is performed at the CPU_1, and the process of S108 is performed at the CPU_2.

In response to receiving data, the CPU_2 performs control of a control target instrument based on input information. The data is processed in such a way, and thereby not only the CPU_1 but also the CPU_2 can receive the input information to perform the control.

For example, if input information is directly transmitted from the input unit to both the CPU_1 and the CPU_2, the communication load would increase due to an increased amount of information or an increased communication cycle. In contrast, when the input unit transmits input information to a single CPU_1 and the CPU_1 then transmits the information to the CPU_2 as with the present embodiment, this achieves advantageous effects such as a reduced processing load or improved communication reliability.

Figure 8:
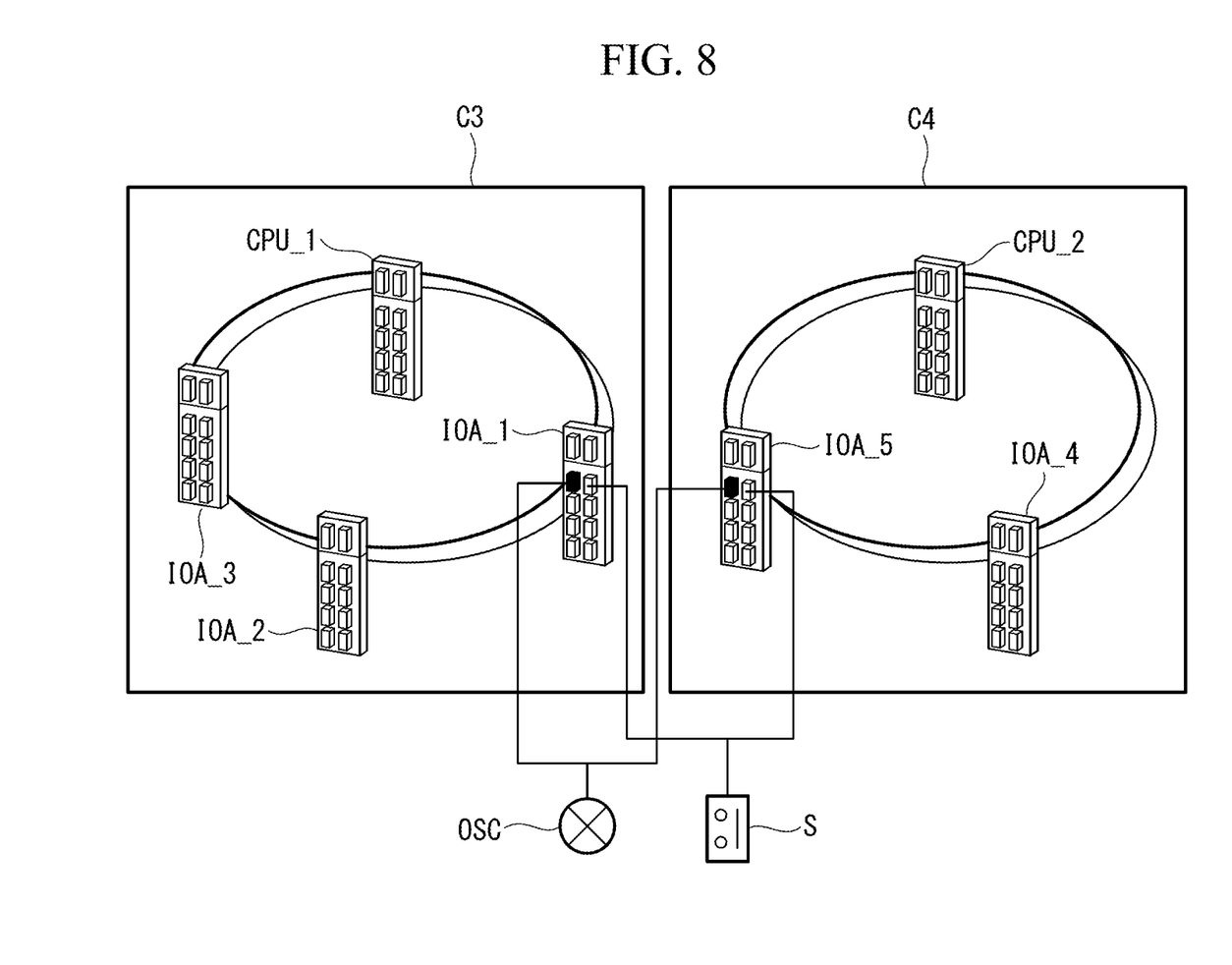
FIG. 8 is a diagram illustrating a general configuration of a control system according to a reference example.
Figure 9:
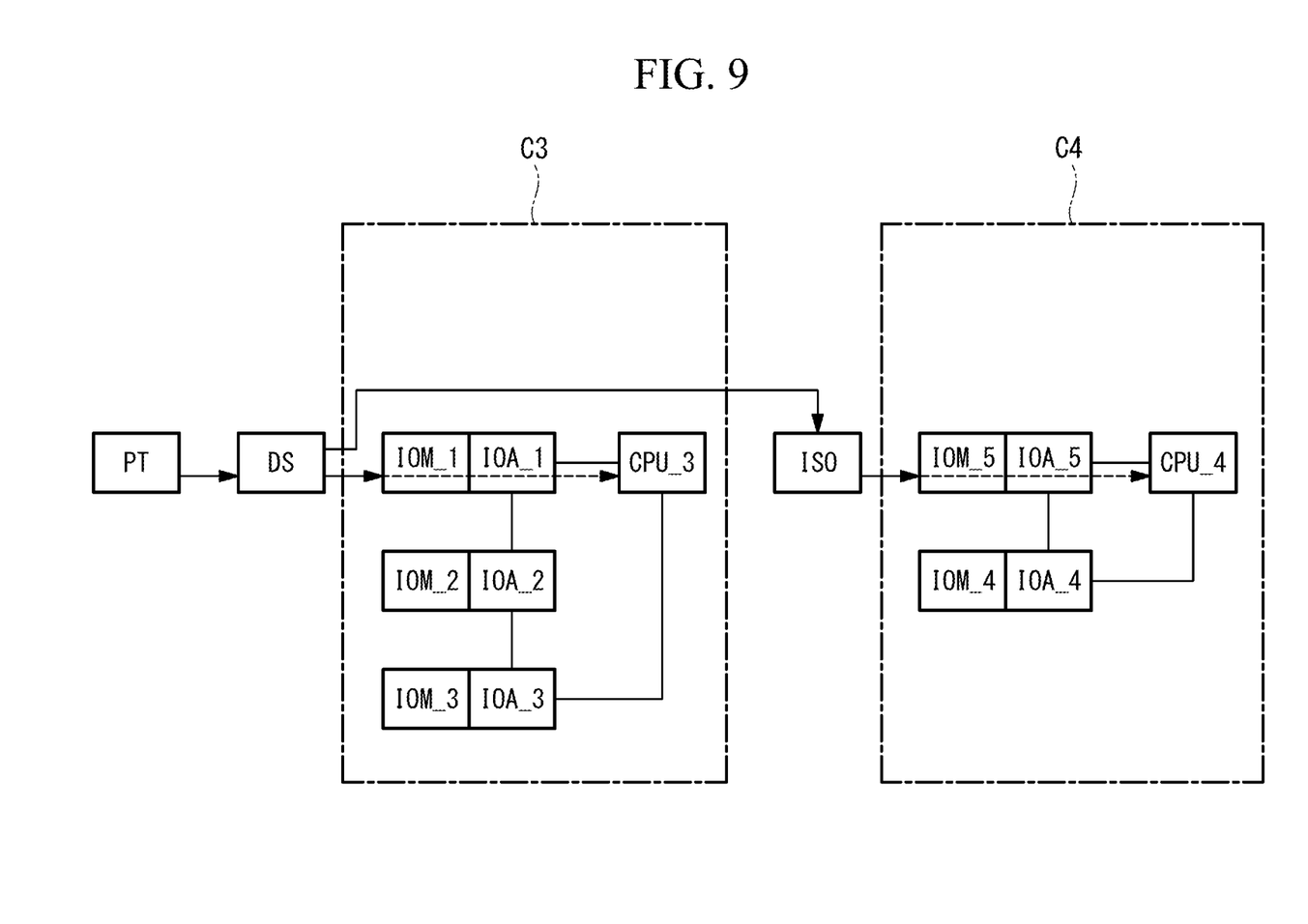
FIG. 9 is a function block diagram illustrating functions of a control device according to the reference example.

Next, advantageous effects achieved by the control device according to the present embodiment will be described with reference to FIG. 8 and FIG. 9. FIG. 8 and FIG. 9 illustrate a configuration of a control device according to a reference example. The reference example refers to a configuration in which an input signal is branched and input to a plurality of control devices. In the reference example, the control device C3 and the control device C4 perform control by using input signals from measuring instruments PT such as an oscillator OSC or a switch S, respectively.

FIG. 8 is a configuration of the reference example corresponding to the configuration of FIG. 3 in the present embodiment. As illustrated in FIG. 8, each of the control device C3 and the control device C4 controls a corresponding control target instrument. Each of an input signal from the oscillator OSC and an input signal from the switch S is branched to the control device C3 and the control device C4 and input to respective IOAs. Thus, IOAs to which the input signals are input are required to be arranged for each of the control device C3 and the control device C4.

FIG. 9 is a diagram illustrating a specific example of the configuration of the control device C3 and the control device C4 illustrated in FIG. 8. In FIG. 9, the oscillator OSC is illustrated as the measuring instrument PT. In the control device C3, IOM_1 and IOA_1, IOM_2 and IOA_2, IOM_3 and IOA_3, and a CPU_3 are provided and connected to each other via the communication network NW. In the control device C4, IOM_5 and IOA_5, IOM_4 and IOA_4, and a CPU_4 are provided and connected to each other via the communication network NW. The signal from the measuring instrument PT is signal-branched at a distributor (power supply device) DS. The branched signal then enters the IOM_1 of the control device C3, and input information is transmitted to the CPU_3 via the IOA_1. On the other hand, the input signal branched at the distributor DS enters the IOM_5 via an isolator (signal isolator) ISO and is transmitted to the CPU_4 via the IOA_5.

As illustrated in FIG. 9, if an input signal from the measuring instrument PT is branched and input to respective control devices, it is required to install not only the distributor DS and the isolator ISO but also an interface cabinet for storing the IOM_5 and the IOA_5 and wiring cables. As illustrated in FIG. 3, however, by transferring input information from the CPU_1 to the CPU_2, it is possible to eliminate the need for instruments required in the case of the reference example. Thus, with the configuration of FIG. 3, the configuration can be simplified, and the costs can be effectively suppressed. Since the configuration is simplified, a shortened construction period can also be expected.

As described above, according to the control device, the control method thereof, and the control program of the present embodiment, the CPU_1 controls a control target instrument based on an input signal input at the input unit IN1 and also transmits input information to the CPU_2 that is another control unit. Thus, the CPU_2 can also perform control based on the input information. Accordingly, since the input unit IN1 can be shared, some configurations of the input unit IN1 can be omitted. That is, the input unit IN1 can be virtualized. The necessary number of input units IN1 is suppressed, and therefore, a reduction in costs can be expected.

The CPU_1 transmits input information to the CPU_2 together with information representing that input is input from the input unit IN1 (source information). This enables the CPU_2 to recognize that the input is the input from the input unit. That is, the input unit IN1 can be virtualized.

The CPU_1 sets the CPU_2 as a destination and transmits the input information to the CPU_2, and thereby input information can be more reliably transmitted from the CPU_1 to the CPU_2.

The present disclosure is not limited to only the embodiment described above and can be modified and implemented in various ways within the scope not departing from the spirit of the invention.

For example, the control device in the present embodiment is provided in a power plant. The control target instrument is, for example, a turbine, a boiler, an ancillary facility, or the like. The control device is not limited to a power plant and can be widely applied.

The control device, the control device thereof, and the control program according to each embodiment described above are understood as follows, for example.

A control device (C1) according to the present disclosure is a control device configured to control a control target instrument, the control device includes: an input unit (IN1) configured to accept input of an input signal including input information and transmit the input information to a digital communication network (NW); and a control unit (CPU_1) configured to receive the input information from the input unit via the digital communication network and perform control based on the input information, and the control unit transmits the received input information via the digital communication network to a further control unit (CPU_2) configured to control a control target instrument in another device (C2) provided independently of the control device.

According to the control device of the present disclosure, the control unit controls a control target instrument based on the input information input at the input unit and also transmits the input information to the further control unit. Thus, also at the further control unit, control can be performed based on the input information. Accordingly, compared to a case where input units are provided to control units, respectively, for example, an input unit can be shared, and therefore, some configurations of the input unit can be omitted. That is, the input unit can be virtualized. The necessary number of input units is suppressed, and therefore, a reduction in costs can be expected.

In the control device according to the present disclosure, the control unit may transmit the input information to the further control unit together with information representing that the input is input from the input unit.

According to the control device of the present disclosure, the control unit transmits, the input information, which includes information representing that the input is input from the input unit, to the further control unit. Accordingly, the further control unit can recognize that the input is the input from the input unit. That is, the input unit can be virtualized.

In the control device according to the present disclosure, the control unit may set the further control unit as a destination and transmit the input information to the further control unit.

According to the control device of the present disclosure, the control unit sets the further control unit as a destination and transmits the input information to the further control unit, and therefore, the input information can be more reliably transmitted from the control unit to the further control unit. That is, the input unit can be virtualized.

In the control device according to the present disclosure, the input unit may form a packet including destination information destined to the control unit, source information originated from the input unit, and the input information and transmit the packet to the digital communication network, and the control unit may receive the packet, convert the destination information into information destined to the further control unit, and transmit the converted information to the further control unit.

According to the control device of the present disclosure, the input unit forms a packet including destination information destined to the control unit, source information originated from the input unit, and the input information and transmits the packet to the digital communication network, and the control unit receives the packet. This enables one-to-one communication between the input unit and the control unit, and the reliability of information transmission can be improved. In addition to this, the control unit converts the destination information into information destined to the further control unit and transmits the converted information to the further control unit. Thus, also in the further control unit, control can be performed based on the input information. That is, the input unit can be virtually shared between the control unit and the further control unit.

The control method according to the present disclosure is a control method of a control device configured to control a control target instrument, and the control method includes steps of, at an input unit, accepting input of an input signal including input information and transmitting the input information to a digital communication network; at a control unit, receiving the input information from the input unit via the digital communication network and performing control based on the input information; and transmitting the received input information via the digital communication network to a further control unit configured to control a control target instrument in another device provided independently of the control device.

The control program according to the present disclosure is a control program for a control device configured to control a control target instrument, and the control program is for a computer to cause the control device to perform processes of, at an input unit, accepting input of an input signal including input information and transmitting the input information to a digital communication network; at a control unit, receiving the input information from the input unit via the digital communication network and performing control based on the input information; and transmitting the received input information via the digital communication network to a further control unit configured to control a control target instrument in another device provided independently of the control device.

REFERENCE SIGNS LIST

110 CPU
120 ROM
130 RAM
140 hard disk drive
150 communication unit
180 bus
A data
B packet
C packet
C1 to C4 control device
CPU_1 to CPU_4 CPU (control unit)
DS distributor
IN1 input unit
IOA_1 to IOA_5 IOA (I/O adaptor)
IOM_1 to IOM_5 IOM (I/O module)
ISO isolator
NW communication network
OSC oscillator
PT measuring instrument
S switch

The invention claimed is:

1. A control device configured to control a control target instrument, the control device comprising:
an Input/Output (I/O) adaptor configured to accept input of an input signal including input information and transmit the input information to a digital communication network; and
a processor configured to receive the input information from the I/O adaptor via the digital communication network and perform control based on the input information,
wherein the processor transmits the received input information via the digital communication network to a further processor configured to control a control target instrument in another device provided independently of the control device such that the input signal is used by a plurality of control devices in a system to transmit the input information from one I/O adaptor to one processor.

2. The control device according to claim 1, wherein the processor transmits the input information to the further processor together with information representing that the input is input from the I/O adaptor.

3. The control device according to claim 2, wherein the processor sets the further processor as a destination and transmits the input information to the further processor.

4. The control device according to claim 3,
wherein the I/O adaptor forms a packet including destination information destined to the processor, source information originated from the I/O adaptor, and the input information and transmits the packet to the digital communication network, and
wherein the processor receives the packet, converts the destination information into information destined to the further processor, and transmits the converted information to the further processor.

5. The control device according to claim 2,
wherein the I/O adaptor forms a packet including destination information destined to the processor, source information originated from the I/O adaptor, and the input information and transmits the packet to the digital communication network, and
wherein the processor receives the packet, converts the destination information into information destined to the further processor, and transmits the converted information to the further processor.

6. The control device according to claim 1, wherein the processor sets the further processor as a destination and transmits the input information to the further processor.

7. The control device according to claim 6,
wherein the I/O adaptor forms a packet including destination information destined to the processor, source information originated from the I/O adaptor, and the input information and transmits the packet to the digital communication network, and
wherein the processor receives the packet, converts the destination information into information destined to the further processor, and transmits the converted information to the further processor.

8. The control device according to claim 1,
wherein the I/O adaptor forms a packet including destination information destined to the processor, source information originated from the I/O adaptor, and the input information and transmits the packet to the digital communication network, and
wherein the processor receives the packet, converts the destination information into information destined to the further processor, and transmits the converted information to the further processor.

9. A control method of a control device configured to control a control target instrument, the control method comprising:
at an I/O adaptor, accepting input of an input signal including input information and transmitting the input information to a digital communication network;
at a processor, receiving the input information from the I/O adaptor via the digital communication network and performing control based on the input information; and
transmitting the received input information via the digital communication network to a further processor configured to control a control target instrument in another device provided independently of the control device such that the input signal is used by a plurality of control devices in a system to transmit the input information from one I/O adaptor to one processor.

10. A non-transitory tangible computer-readable storage medium storing a control program for a control device configured to control a control target instrument, the control program being for a computer to cause the control device to perform processes of:
at an I/O adaptor, accepting input of an input signal including input information and transmitting the input information to a digital communication network;

at a processor, receiving the input information from the I/O adaptor via the digital communication network and performing control based on the input information; and transmitting the received input information via the digital communication network to a further processor configured to control a control target instrument in another device provided independently of the control device such that the input signal is used by a plurality of control devices in a system to transmit the input information from one I/O adaptor to one processor.

* * * * *